(12) United States Patent
Jessen

(10) Patent No.: US 8,033,209 B2
(45) Date of Patent: Oct. 11, 2011

(54) LIFTING MECHANISM, AND METHOD FOR TRIGGERING A LIFTING MECHANISM

(75) Inventor: Soenke Jessen, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 585 days.

(21) Appl. No.: 12/198,615

(22) Filed: Aug. 26, 2008

(65) Prior Publication Data

US 2009/0056531 A1 Mar. 5, 2009

(30) Foreign Application Priority Data

Aug. 29, 2007 (DE) .......................... 10 2007 040 877

(51) Int. Cl.
*F15B 11/028* (2006.01)
*A01B 63/10* (2006.01)
(52) U.S. Cl. ............................................. 91/433; 701/50
(58) Field of Classification Search .................... 60/468; 91/433; 701/50
See application file for complete search history.

(56) References Cited

U.S. PATENT DOCUMENTS 5,855,159 A * 1/1999 Yoshida et al. .................. 91/466
7,490,421 B1 * 2/2009 Pletzer et al. .................... 701/50

FOREIGN PATENT DOCUMENTS

| DE | 36 28 427 | | 2/1988 |
| DE | 43 21 637 | | 1/1995 |
| DE | 195 41 190 | | 5/1997 |
| DE | 198 31 595 | | 1/2000 |
| DE | 19939796 | C1 * | 11/2000 |
| DE | 10 2005 005 314 | | 6/2006 |
| DE | 102005005314 | A1 * | 6/2006 |

OTHER PUBLICATIONS

RE 66 125 Hitch Control Valves, Sep. 2004 (in English).
RE 66 130 SB23-LS Directional Control Valves, Feb. 2007 (in English).

* cited by examiner

*Primary Examiner* — Thomas E Lazo
(74) *Attorney, Agent, or Firm* — Michael J. Striker

(57) ABSTRACT

A lifting mechanism has a continuously variable lifting mechanism valve, with a multi-position valve, by way of which a lifting cylinder can be made to communicate with a pump or a tank. In the flow path of the pressure fluid from the multi-position valve to a pressure chamber, effective in the "carrying" direction, of the lifting cylinder, there is a relief pressure limiting valve, by way of which a relief pressure can be proportionally set. During relief pressure regulation, a metering aperture, which is predetermined by the proportionally variable multi-position valve, is opened, so that the volumetric flow of pressure fluid to the tank is minimized via the pressure limiting valve.

24 Claims, 4 Drawing Sheets

LIFTING MECHANISM, AND METHOD FOR TRIGGERING A LIFTING MECHANISM

CROSS-REFERENCE TO A RELATED APPLICATION

The invention described and claimed hereinbelow is also described in German Patent Application DE 10 2007 040 877.5 filed on Aug. 29, 2007. This German Patent Application, whose subject matter is incorporated here by reference, provides the basis for a claim of priority of invention under 35 U.S.C. 119(a)-(d).

BACKGROUND OF THE INVENTION

The present invention relates to a lifting mechanism and to a method for triggering a lifting mechanism.

Modern tractors, besides their conventional task as a pulling machine, also take on the tasks of supplying energy to and controlling attachments that are suspended from or semi-mounted on a lifting mechanism. This last function is accomplished on the one hand by a power takeoff shaft of the tractor or by the work hydraulics. In tractors of the medium and upper power categories, electrically triggerable multi-position valves for controlling the work functions of the attachments are being used more and more. The control of these hydraulic functions is typically effected via a compact control block, in which the control is combined in a single unit with all the essential multi-position valves and regulating valves. One such control block, intended for so-called electrohydraulic lifting mechanism regulation (EHR), is described for instance in the data sheet RD 66 125/09.04 (*EHR-Ventile [EHR Valves]*) published by Bosch Rexroth AG.

In German Patent Application DE 10 2005 005 314 A1, a double-action lifting mechanism is described, with which an attachment can be triggered actively in the "lifting" (carrying) direction or in the "pressing" (lowering) direction. The working range for "carrying" occurs for instance in plowing or cultivating. The working range for "pressing" is set for instance in active plow retraction or in a packer. In a load-free intermediate position, in which the lifting mechanism is not subjected to a force, the work unit rests on the ground by its own weight. This intermediate position is set in a floating position of the lifting mechanism valve.

The pressure that is operative in the "pressing" direction is limited, in the known version, via a proportionally variable pressure limiting valve on the basis of the setting by the driver and the operating state of the EHR.

In some applications, such as mowing, it is desirable to adapt the force with which of the work unit rests on the ground. For instance, a mowing mechanism should rest on the ground with only a very slight load, since then the turf is not damaged, and fuel economy is made possible as well.

For regulating this kind of relief pressure, it is proposed in German Patent Disclosures DE 36 28 427 A1 and DE 195 41 190 A1 that the pressure operative in the "carrying" direction be limited via a proportionally variable pressure limiting valve, so that the relief pressure cannot exceed the preset maximum pressure. It is a disadvantage of this version is that in this relief pressure regulator, a large volumetric flow of pressure fluid flows away to the tank, via the opened metering aperture of the lifting mechanism valve and via the pressure limiting valve, and thus on the one hand, pressure fluid becomes heated, and on the other, hydraulic energy is wasted. In the first of these two references, the problem is that the snow plow cannot move lower and hence is unable to follow the contour of the ground.

Versions are also known in which relief pressure regulation is done by activating two hydraulic reservoirs as a function of the signal of a pressure sensor. In alternative versions, it is proposed that the work unit, such as a mowing mechanism, be relieved via a spring assembly. Such versions are quite complex and expensive and require considerable space. A further disadvantage of spring relief is that during the work process, no variation of the forces operative in the "carrying" direction is possible, and thus these systems lack the flexibility desired for high-quality tractors.

SUMMARY OF THE INVENTION

By comparison, it is the object of the invention to create a lifting mechanism and a method for triggering a lifting mechanism in which relief is possible with little effort and expense in terms of equipment and energy.

In keeping with these objects and with others which will become apparent hereinafter, one feature of the present invention recites, briefly stated in a lifting mechanism of an agricultural utility vehicle or mobile work unit, which is adjustable via an electrohydraulic lifting mechanism regulator (EHR), in which a pressure chamber (14), operative in the "carrying" direction, of a lifting cylinder (10) is capable of being supplied with pressure fluid via a continuously variable multi-position valve (26) having an adjustable metering aperture, characterized by a proportionally variable relief pressure limiting valve (44) in a forward-flow line (36, 20) between the metering aperture and the pressure chamber (14), by way of which valve the pressure in the forward-flow line (36, 20) is variable as a function of operating states of the lifting mechanism, and characterized by a control unit, by way of which in relief pressure regulation, the metering aperture is capable of being set to a volumetric flow of relief pressure fluid.

Another feature of the present invention recites, briefly stated in a method for triggering a lifting mechanism (1), which has a lifting cylinder (10), which is adjustable by means of an electrohydraulic lifting mechanism regulator and the pressure chamber (14) of which, operative in the "carrying" direction, is supplied with pressure fluid via a multi-position valve (26) having a metering aperture, and the pressure in a forward-flow line (20, 36) between the pressure chamber (14) and the metering aperture is limited via a proportionally variable relief pressure limiting valve (44), wherein for the relief, the relief pressure limiting valve (44) is set to a relief pressure, and the metering aperture, for reducing the volumetric flow of pressure fluid, is reduced to a relief volumetric flow.

According to the invention, the lifting mechanism is embodied with an electrohydraulic lifting mechanism regulator, and a pressure chamber, operative in the "carrying" direction, of a lifting cylinder is supplied with pressure fluid via a continuously variable multi-position valve having an adjustable metering aperture. According to the invention, a proportionally variable relief pressure limiting valve is provided in a forward-flow line, between the metering aperture and the pressure chamber, and by way it, which the pressure in the forward-flow line is variable as a function of operating states of the lifting mechanism, and a control unit of the lifting mechanism regulator is designed such that for relief pressure regulation, the metering aperture can be set to a comparatively low relief volumetric flow, so that the volumetric flow of pressure fluid flowing out via the relief pressure limiting valve is minimized.

Such an embodiment can be implemented with very little effort or expense; no pressure sensors, pressure reservoirs, or spring assemblies are required for the relief. The system can be implemented with very little space at minimal cost, and because of the low volumetric flow of pressure fluid flowing out via the relief pressure limiting valve, the energy losses are minimized as well compared to the versions described at the outset.

By the method of the invention, the metering aperture is accordingly opened during the relief pressure regulation, to minimize energy losses.

According to the invention, it is preferable for the electrohydraulic lifting mechanism regulator to be embodied as an LS or LUDV system, and an individual balance is assigned to the metering aperture.

Optionally, the lifting mechanism can be embodied with an additional pressure sensor and optionally additional hydraulic reservoirs for performing conventional pressure regulation.

The concept according to the invention can be employed in both single-action and double-action lifting mechanisms.

In a double-action lifting mechanism, the pressure operative in the "pressing" direction can also be limited by a continuously variable pressing-down pressure limiting valve.

According to the invention, it is preferable if the pressure range that can be set via the pressure limiting valves is in the range between 5 and 230 bar.

The relief pressure limiting valve is preferably designed with a descending characteristic curve, so that in the event of a power failure, the maximum pressure is set, and the work unit is thus reliably supported.

In an exemplary embodiment, the relief pressure regulation is set manually by the operator at a control panel.

The control unit of the electrohydraulic lifting mechanism regulator, in one exemplary embodiment, is designed such that both positional and relief regulation can be performed simultaneously.

In the relief pressure regulation according to the invention, upon lowering the lifting mechanism, the individual balance can first be blocked, so that no volumetric flow of pressure fluid is passed over this balance. The multi-position valve is adjusted in the "lowering" direction, and the relief pressure limiting valve is set to its maximum pressure. When a predetermined set-point position is reached, the lifting mechanism valve is switched to "carrying"/"lifting", and the relief pressure manually set by the operator is set at the relief pressure limiting valve, so that the relief pressure regulation takes place in the predetermined manner.

The aforementioned set-point position can be determined in that first, a work unit placed against the lifting mechanism is lowered until it rests on the ground. Next, the lifting mechanism is raised for a brief time with an increased volumetric flow of pressure fluid, or in other words by opening the metering aperture, and after this brief interval (for instance of 1 second), the lifting mechanism valve is set to the preselected relief pressure.

In an especially convenient regulating method, the relief pressure can be increased or reduced as a function of an upward or downward motion of the work unit in its working position—the motion being caused for instance by unevenness of the ground.

In principle, it is also possible for the volumetric flow of relief pressure fluid, set via the metering aperture, to be varied as a function of the change in the lifting mechanism position or as a function of the motion of the lifting mechanism.

The lifting mechanism according to the invention with a relief pressure limiting valve makes very effective vibration damping possible. To that end, first the position of the lifting mechanism is regulated, in order to keep it in a set-point position; simultaneously, the above-described relief regulation takes place in a relief set-point position, which is somewhat below the set-point position for regulating the position. In other words, the two regulators in a certain sense operate counter to one another; via the relief pressure regulator, the pressure limiting valve is opened, in order to set the lifting mechanism to the somewhat lower relief set-point position. However, because of the setting of the metering aperture, this outflowing volumetric flow of pressure fluid is comparatively slight, so that these energy losses are tolerable.

This vibration damping has to be manually enabled by the operator, or, as with rear EHR vibration damping, it must be activated in the transporting position and upon reaching a defined travel speed.

For ascertaining the relief pressure during the vibration damping, the relief pressure can first be reduced at the relief pressure limiting valve, until the lifting mechanism drops. Next, the relief pressure is increased by a predetermined pressure difference, and this pressure value is used as the basis for the vibration damping.

For safety reasons, the relief pressure regulator is stopped when an external switch or the like is actuated.

According to the invention, it is preferable for the volumetric flow of pressure fluid to be set via the metering aperture, during the relief regulation, to less than 50 L/min, but preferably to approximately 10 L/min.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

The invention will be described below in terms of a double-action front or rear lifting mechanism of a tractor. In principle, the lifting mechanism of the invention and the method of the invention can be employed in other mobile work units as well.

The basic construction of the double-action lifting mechanism is described in detail in German Patent Disclosure DE 10 2005 005 314 A1, so that here, only the essential components for comprehension of the invention will be addressed here; for the rest, see the aforementioned reference.

Figure 1:
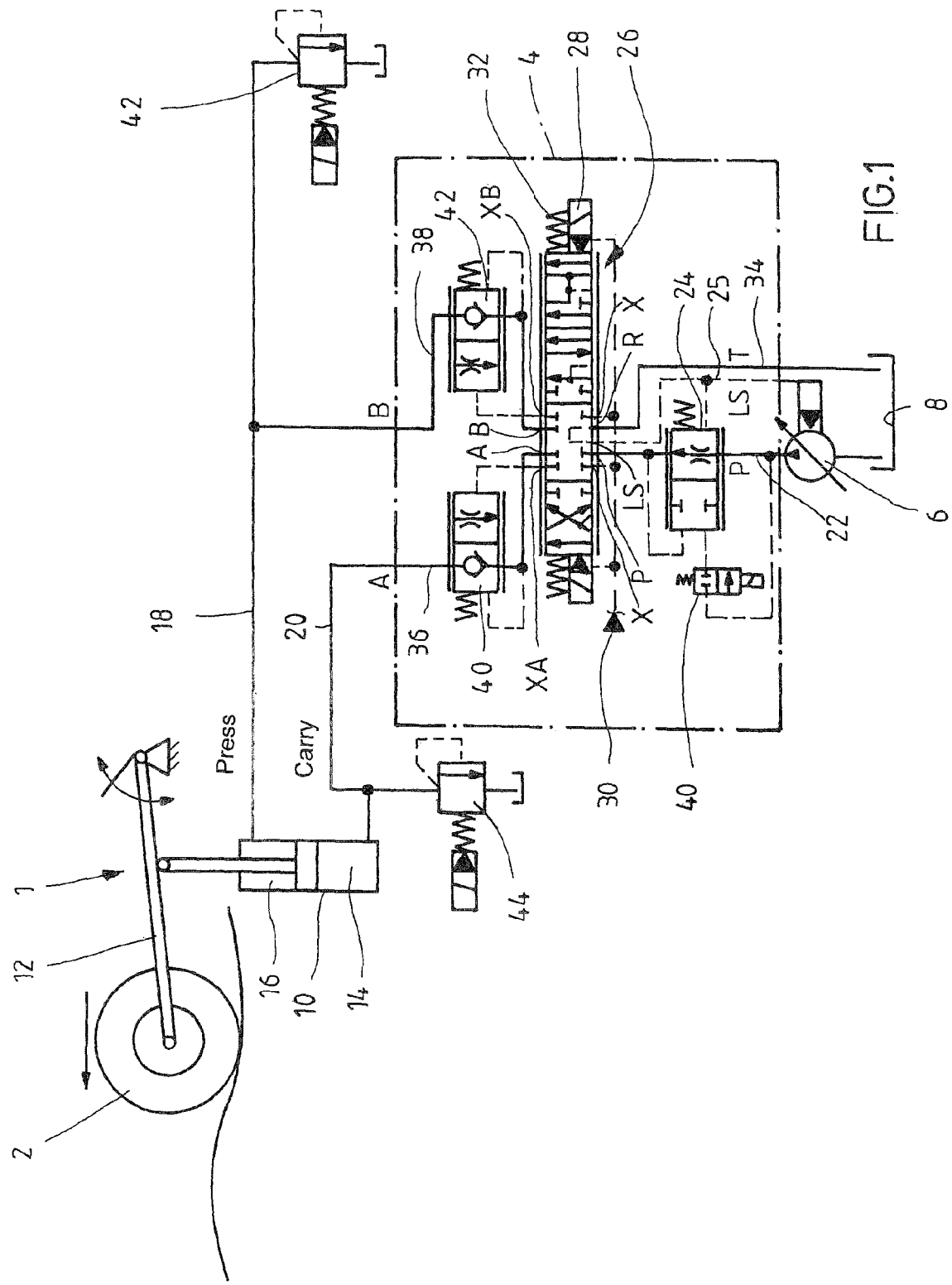
FIG. 1 is a hydraulic circuit diagram of a double-action lifting mechanism.

In the circuit diagram shown in FIG. 1, an attachment 2, such as a mowing mechanism, is carried by a lifting mechanism 1 of a tractor. The triggering of the lifting mechanism 1 is effected via a lifting mechanism valve assembly 4, by way of which pressure chambers, operative in the "pressing" or "carrying" directions, of the lifting mechanism 1 can be made to communicate with a pump 6 or a tank 8. The lifting mechanism 1 has a lifting cylinder 10, by way of which a steering assembly 12, pivotably connected to the tractor and carrying the attachment 2, can be pivoted for raising or lowering the attachment 2. The lifting cylinder 10 has a pressure chamber 14 that is operative in the "carrying" direction and an annular chamber 16 that is operative in the "lowering" direction, each of them communicating via respective work lines 18, 20 with work connections A, B of the lifting mechanism valve assembly 4.

The construction of such lifting mechanism valves is described for instance in the data sheet RD 66 130/02.07 or the data sheet mentioned at the outset, RD 66 165/09.04, published by Bosch Rexroth AG. Typically, these lifting mechanism valve assemblies are embodied in disk form and are integrated in the mobile control block. In the exemplary embodiment shown, the lifting mechanism valve 4 is embodied as an LS valve, but in principle the invention can be used in LUDV valves as well, of the kind described for instance in German Patent Disclosure DE 198 31 595 A1.

The LS lifting mechanism valve 4 has a pressure connection P and a tank connection T, which communicate with the pump 6 and the tank 8, respectively.

An LS pressure balance 24 is located in an inflow conduit 22 connected to the connection P; it is urged in the opening direction by the force of a spring and by the load pressure of the lifting cylinder 10 in an LS conduit 26 and in the closing direction by the pressure downstream of the LS pressure balance 24. The inflow conduit 22 leads to a pressure connection P of a continuously variable multi-position valve 26 that is adjustable via a pilot valve assembly 28. This assembly for instance comprises pilot valves, which can be triggered via a joystick and are connected to a control oil supply 30. A valve slide of the multi-position valve 28 is prestressed via a centering spring assembly 32 into a basic position (0), in which the inlet connection P and two work connections A, B and control connections XA, exemplary embodiment and X are blocked, and an LS connection LS communicates with a return connection R. The return connection R is connected via an outflow conduit 34 to the tank connection T of the lifting mechanism valve assembly 4.

By suitable setting of the pilot valve assembly 28, the multi-position valve can be adjusted from its basic position (0) as shown in the direction of positions marked (a) ("pressing") in FIG. 1, in which positions, via a metering aperture, a pressure fluid connection from the inlet connection P to the work connection B is opened up, so that pressure fluid is correspondingly fed into the annular chamber 16 of the lifting cylinder 10. The pressure fluid positively displaced from the pressure chamber 14 flows away, via the opened lowering module 40 and the work connection A communicating with the return connection R, to the tank 8.

Upon adjustment to the positions marked (b) ("carrying"), a pressure fluid communication is made via the metering aperture from the pressure connection P to the work connection A and from the work connection B of the multi-position valve 26 to the return connection R, so that for raising the attachment, pressure fluid is correspondingly fed into the pressure chamber 14, and the pressure fluid positively displaced from the annular chamber 16 flows away to the tank 8. Upon displacement of the valve slide of the multi-position valve 26 into its floating position, marked (c), the two work connections A, B of the multi-position valve 26, and thus also the two pressure chambers 14, 16 of the lifting cylinder 10, communicate with the return connection, so that the attachment 2 rests on the ground in a load-free manner.

The two work connections A, B of the multi-position valve 26 communicate with the work connections A, B of the lifting mechanism valve assembly 4 via a forward-flow conduit 36 and an outflow conduit 38, respectively. In each of the conduits 36, 38, a respective lowering module 40, 42 is provided, which in a spring-prestressed basic position acts as an unblockable check valve for fastening the lifting cylinder 10 in a manner free of leak fuel and, in regulating positions, controls the volumetric flow of pressure fluid flowing back from the lifting cylinder 10 to provide outflow control. To that end, each lowering module 40, 42 is urged in the direction of its check position by the pressure at the associated work connection A, B of the multi-position valve 26 and in the direction of its opening/throttling position by the control pressure of the control oil supply 30.

The individual load pressure at the lifting cylinder 10 is picked up via the LS connection of the multi-position valve 26 and urges the individual balance 24—as already noted—in the opening direction.

For extending the lifting cylinder 10, that is, moving it outward, the multi-position valve 26 is adjusted in the direction of its carrying position (b), so that the pressure fluid is fed into the pressure chamber 14 via the inflow conduit 22, the individual balance 24, the opened metering aperture of the multi-position valve 26, the work connection A of the multi-position valve 26, the check valve of the lowering module 40, the forward-flow conduit 36, and the work line 20. The pump pressure is set such that it is always higher, by a predetermined pressure difference, than the highest load pressure of all the consumers (LS system). The pressure fluid positively displaced from the annular chamber 16 on the extension of the lifting cylinder 10 flows away to the tank 8, via the work line 18, the outflow conduit 38, the lowering module 42 that is opened via the control pressure in the control oil supply 30, the connections B, R of the multi-position valve 26, and the tank conduit 34. The lowering module 42 acts as an outflow balance, by way of which the outflowing volumetric flow of pressure fluid is regulated to a certain extent.

The retraction of the lifting cylinder 10 and the lowering of the attachment 2 from an upper lifting mechanism position is effected accordingly by adjustment of the multi-position valve 26 in the direction of its lowering position (a).

In the exemplary embodiment shown in FIG. 1, the individual balance 24 can be fixed in their closing position, in that via an electrically actuated 2/2-way pilot valve 40, the control face operative in the closing direction is acted upon by the pressure upstream of the individual balance 24, which—as mentioned above—is greater in every case than the load pressure on the lifting cylinder 10, so that the individual balance 24 is kept closed. By means of this provision, it is possible despite the opened metering aperture to block off the flow path of pressure fluid between the pump 6 and the multi-position valve 26.

The pressure in the work line 18 can be limited via a continuously variable pressing-down pressure limiting valve 42, so that the pressure in the annular chamber 16, regardless of the setting of the multi-position valve and of the pump pressure, can be set, for instance in a range between 5 and 230 bar. In this way, for instance by adjusting the pressure limiting valve 42 to its minimal pressure, such as 5 bar, the actually double-action lifting mechanism 1 can be operated in single-action fashion, so that the attachment 2, even when the multi-position valve 26 is set to its "pressing" position (a), drops practically by its own weight. After this lowering, the multi-position valve 26 can then be adjusted to its floating position (c), so that any unevenness of the ground can be compensated for. The set behavior is then equivalent to that of conventional single-action lifting mechanism valves.

Up to this point, the construction of the lifting mechanism 1 corresponds to that in German Patent Application DE 10 2005 005 314 A1.

According to the invention, a relief pressure limiting valve 44 is provided in the work line 20; it is likewise embodied as continuously variable, and by way of it, the pressure in the work line 20 can be limited, for instance to values between 5 and 230 bar. This relief pressure limiting valve 44 makes relief pressure regulation possible, which will be described in detail below.

Figure 2:
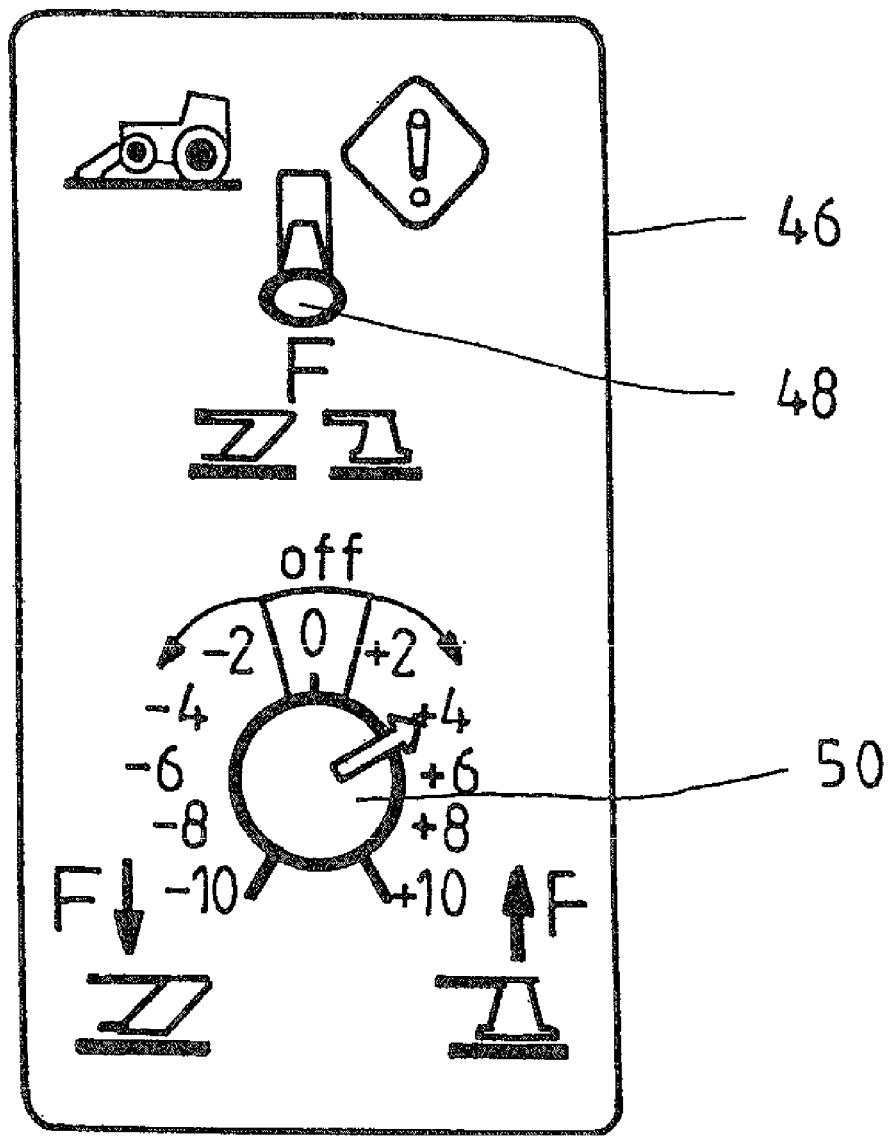
FIG. 2 is a basic illustration of a control panel for relief pressure regulation.

In FIG. 2, a part of a control panel of the tractor is shown, by way of which the relief pressure limiting valve 44 can be adjusted for setting a maximum pressure in the work line 20. Accordingly, this control panel 46 has a switch by way of which the relief pressure regulation described below can be set (switch moved downward). When the switch is shifted upward, the maximum pressure is set via the relief pressure limiting valve 44, so that the tractor can be lifted out, as shown at top left in FIG. 2, by lowering of the lifting mechanism 1. On the control panel 46, a potentiometer 50 is also provided, by way of which, in a double-action lifting mechanism, the pressure limitable via the "pressing" pressure limiting valve 42 can be set (potentiometer to the left in FIG. 2), or the pressure operative in the "carrying" direction can be set via the relief pressure limiting valve 44. In the neutral position (0) of the potentiometer 50, the lifting mechanism 1 is operated in single-action fashion; that is, the pressure in the work line 18 is limited to the minimum value. Accordingly, by rotating the potentiometer 50 to the right in FIG. 2, the relief pressure regulation can be activated, whereupon the relief pressure increases, with increasing adjustment of the potentiometer 50 out of its basic position.

In "normal" operation of the lifting mechanism 1, the relief pressure limiting valve 44 is always set to the maximum pressure, so that the attachment can be securely carried. The potentiometer 50 is set to its 0 position then. The triggering of the lifting mechanism 1 is typically done in accordance with positional and/or tensile-force regulation. This maximum relief pressure is also preset by the control unit of the lifting mechanism regulator if the electrohydraulic lifting mechanism regulator stops or locks, such as when the tractor is started, or if there is an error, and so forth, and also in the transporting position, which is set via a mode switch.

The relief pressure limiting valve 44 is embodied with a descending characteristic curve and is prestressed via a comparatively strong spring in the direction of the maximum pressure. Setting the pressure that is to be limited is done via a proportionally variable electromagnet 45 that acts counter to the spring. Such pressure limiting valves with a descending characteristic curve are used for instance in fan drives for cooling systems for internal combustion engines. In this respect, see German Patent Disclosure DE 43 21 637 A1.

Figure 3:
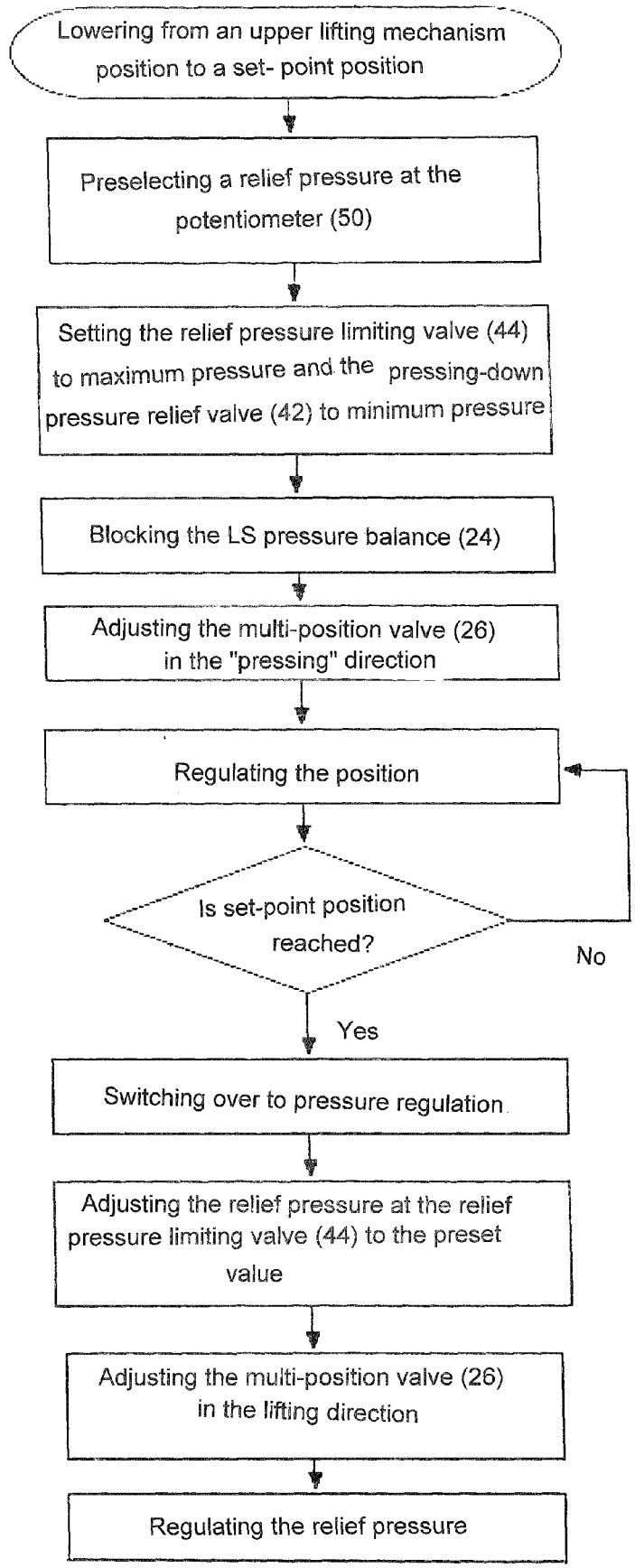
FIG. 3 is a flow chart to explain the relief pressure regulation.

Let it be assumed that the attachment 2 is in an upper lifting mechanism position. Lowering of the attachment is then initially effected in a positionally regulated fashion. Via the control unit, the relief pressure limiting valve 44 is set to a maximum pressure (see FIG. 3), regardless of the setting of the potentiometer 50. The press pressure limiting valve 42 is set to its minimum pressure via the control unit, so that the lifting mechanism 1, as described above, behaves like a single-action lifting mechanism. The pilot valve 40 is adjusted to its open position when electric current is supplied to the switching magnet, so that the control face operative in the closing direction of the balance is acted upon by the pump pressure, and the LS pressure balance 24 is kept closed— hence no pressure fluid can flow out to the lifting cylinder 10 via the multi-position valve 26. The multi-position valve 26 is adjusted by the operator, by suitable setting of the pilot valve assembly 28, in the "pressing" direction (a), so that because of the weight of the attachment 2 the lifting cylinder 10 is retracted, and the pressure fluid flows out of the pressure chamber 14, which is decreasing in size, to the tank 8, via the lowering module 40 and the opened pressure fluid communication between the work connection A and the return connection R of the multi-position valve 26. The relief pressure limiting valve 44 remains set to its maximum value.

Once the lifting mechanism 1 has reached its set-point position, in which it has for instance moved away from the relief pressure regulation in the previous work operation, the switchover from the positionally controlled lowering to pressure regulation takes place. To that end, the relief pressure limiting valve 44 is abruptly adjusted to the pressure set by the operator at the potentiometer 50, and the multi-position valve 26 is quickly adjusted from "pressing" to "carrying". As a result, the relief pressure limiting valve 44 opens, and the lifting mechanism 1 is braked relatively gently and then rests, at the relief pressure predetermined via the potentiometer 50, on the ground. The pilot valve 40 is returned to its blocking position, so that the LS pressure balance 24 is adjusted to the regulating position, in order to keep the pressure drop constant, independently of the load, via the opened metering aperture between the connections P and A of the multi-position valve 26. During the relief regulation, the metering aperture is set to a very small lifting volumetric flow of pressure fluid, which is for instance approximately 10 L/min.

The switchover position, in which the switchover from regulating the position to regulating the pressure is made, is not necessarily exactly the previous relief pressure position but instead is located somewhat above it, depending on the lowering speed. As a result, there is sufficient "braking distance" available for the setting down onto the ground to be done as gently as possible.

In the event that when the relief pressure regulation is set, no "switchover position" from the previous operation is known, then this "switchover position" is determined by first lowering the lifting mechanism 1, by adjusting the multi-position valve 26 to the "pressing" position (a), until the attachment 2 rests with its full weight on the ground. Via the sensors of the position regulator, the stoppage of the lifting mechanism 1 is detected. The multi-position valve 26 is thereupon reversed to its "carrying" position (b), in which the metering aperture is relatively wide open, so that the lifting mechanism is raised with a large volumetric flow of pressure fluid. After a predetermined brief time interval (approximately 1 second), the metering aperture is reset to the usual lesser value (such as 10 L/min), and the relief pressure regulation is performed in the manner described.

The relief pressure regulation is terminated when the EHR position regulator no longer specifies any lowering. This is the case for instance upon stoppage of the lifting mechanism regulator or upon an adjustment of the set-point position value at the set-point position value potentiometer.

Setting the relief pressure regulation is not possible if the lifting mechanism 1 is in its transporting position, or if actuation is done via an external switch. The suppression of the relief pressure regulation with the external switch actuated is therefore important, since if the attachment 2 is "relatively lightweight" and the relief pressure regulation is set to a value corresponding to a "relatively heavy" attachment and upon actuation of the switch in the direction of lowering the lifting mechanism 1, when the "previous position" is reached, switching to relief takes place, and the lifting mechanism 1 is moved upward again, even though a motion in the "lowering" direction has been specified by the switch. This unwanted motion of the lifting mechanism is very dangerous and is prevented by the safety strategy.

In principle, it is also possible for the volumetric flow of pressure fluid for the lowering operation to be controlled via the proportionally variable multi-position valve 26.

In the above-described exemplary embodiment, the relief proportional valve 44 is set to a constant value during relief pressure regulation. However, it is also possible for this pressure, predetermined via the relief pressure limiting valve 44, to be varied as a function of operating states of the lifting mechanism 1.

For instance, upon major changes of position of the lifting mechanism 1, which are detectable via the position sensor of the position regulator, it is conceivable to vary the pressure value set at the relief pressure limiting valve 44. It can then for instance raise the pressure at the relief pressure limiting valve 44, in order to reinforce an upward motion of the lifting mechanism. Accordingly, a lowering motion of the lifting mechanism 1 can be reinforced by reducing the pressure at the relief pressure limiting valve 44. This is especially important because an excessively slow lowering speed is problematic in practice; in mowing, for instance, behind a bump on the ground, the grass is still relatively high. This criterion is taken into account as a quality criterion in practice in assessing mowing mechanism suspensions, so that the strategy according to the invention makes a functional advantage possible here.

It is also possible, in the event of changes of position of the lifting mechanism 1, to adapt the volumetric flow via the multi-position valve 26. As a result, better pressure relief, for instance, can be accomplished especially during fast lifting motions. In conventional lifting mechanisms, these fast lifting motions can often not be accomplished, since the pressure fluid in the pressure chamber 14 cannot be replenished fast enough.

Figure 4:
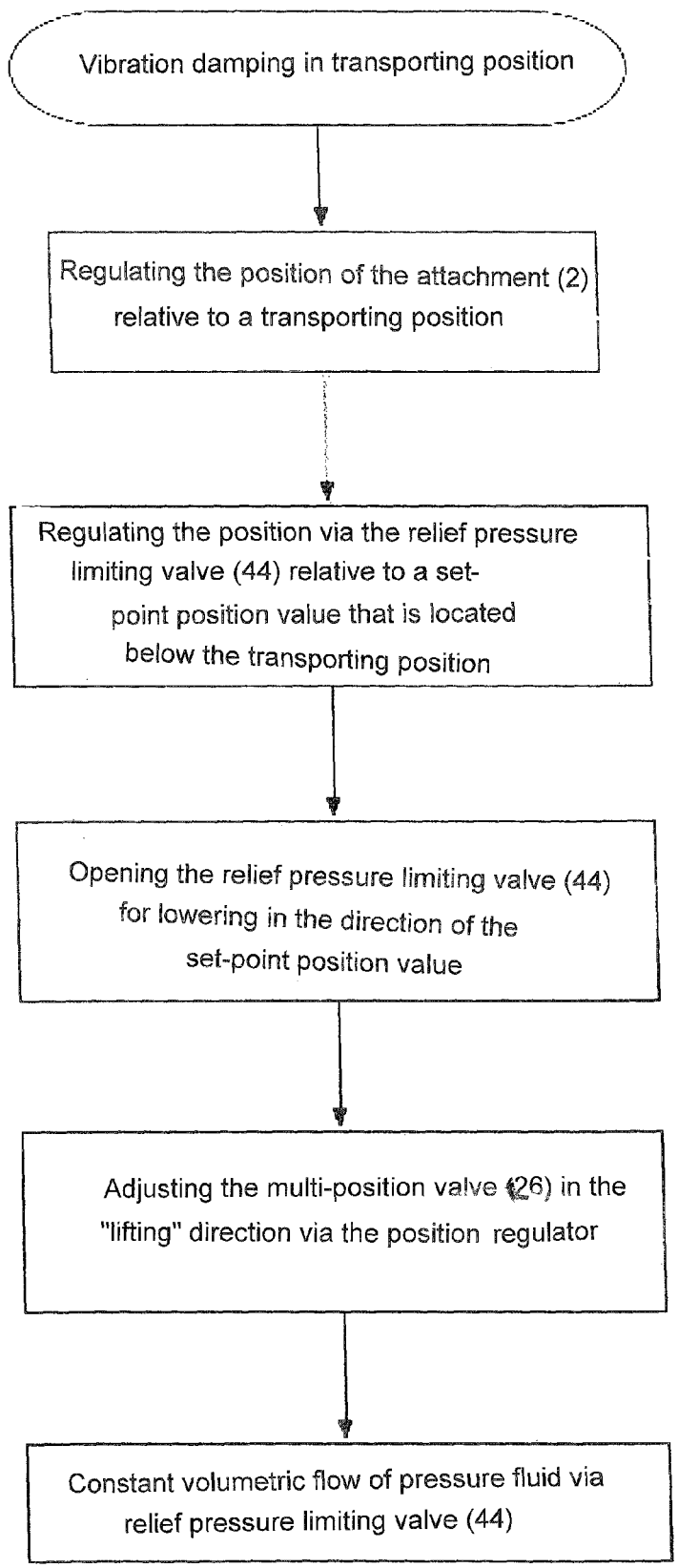
FIG. 4 is a flow chart of a vibration damping operation.

As shown in FIG. 4, via the lifting mechanism regulator according to the invention, effective vibration damping can also be implemented. The fundamental concept of this vibration damping is that the relief pressure limiting valve 44 always has a flow through it and the weight of the attachment 2 can be said to "flow" on the opened relief pressure limiting valve. This is achieved by means of two regulators operating counter to one another. In this case, a position regulator keeps the attachment 2 in its upper transporting position. With the relief pressure limiting valve 44, a position regulator is then likewise actuated, whose set-point position value is somewhat below the transporting position. As a result, the relief pressure limiting valve 44 opens, so that pressure fluid can flow away to the tank 8, and the lifting mechanism 1 is lowered into a lower position. The position regulator of the transporting position then puts the multi-position valve 26 in the "carrying" position (b) again, whereupon the two volumetric flows of pressure fluid cancel one another out, so that the lifting mechanism 1 "floats" between these two set-point position values (the transporting position and the set-point position value of the position regulator via the relief pressure limiting valve 44), and pressure fluid constantly flows away via the open relief pressure limiting valve.

The magnitude of this volumetric flow of pressure fluid depends on the spacing between the two set-point position values and is thus easy to set. The greater this volumetric flow of pressure fluid, the gentler and more effective is the vibration damping, although this vibration damping does involve greater losses.

In principle, however, it is also possible to perform damping with the relief pressure limiting valve 44 predominantly closed. Practical experiments, however, show that this vibration damping is not as effective as the vibration damping described above. The above-described vibration damping can be activated only in the transporting position and upon setting of "damping" at the control panel. In the event of locking of the EHR, the vibration damping cannot be activated.

For setting the pressure level required for the vibration damping, first, upon starting of the vibration damping, the pressure setting of the relief pressure limiting valve 44 is reduced in a ramp; for a 200 bar reduction, a time period of approximately 4 seconds can be provided. If then it is detected at the position sensor of the position regulator that the lifting mechanism 1 is moving downward, the correct pressure setting for the relief pressure limiting valve 44 is discovered, or—more precisely—has already been exceeded. The pressure set at the relief pressure limiting valve 44 is then increased by a fixed pressure value, and beginning at this basic pressure value, the position regulator is started by means of the relief pressure limiting valve 44. The regulator for this regulation of the position by means of the relief pressure limiting valve 44 has one proportional component and one integral component, and the latter compensates for the error made in searching for the pressure.

The concept according to the invention can also be employed in single-action lifting mechanisms. In that case, the potentiometer 50 can suitably be adjusted in only one direction (to the right in FIG. 2).

A lifting mechanism and a method for triggering a lifting mechanism are disclosed. The lifting mechanism has a continuously variable lifting mechanism valve, with a multi-position valve, by way of which a lifting cylinder can be made to communicate with a pump or a tank. In the flow path of the pressure fluid from the multi-position valve to a pressure chamber, effective in the "carrying" direction, of the lifting cylinder, there is a relief pressure limiting valve, by way of which a relief pressure can be proportionally set. During relief pressure regulation, a metering aperture, which is predetermined by the proportionally variable multi-position valve, is opened, so that the volumetric flow of pressure fluid to the tank is minimized via the pressure limiting valve.

The invention claimed is:

1. A lifting mechanism for an agricultural utility vehicle or mobile work unit, comprising:
   an electrohydraulic lifting mechanism regulator for adjustment and including a pressure chamber operating in a "carrying" direction, of a lifting cylinder supplyable with pressure fluid via a continuously variable multi-position valve having an adjustable metering aperture;
   a proportionally variable relief pressure limiting valve in a forward-flow line between said metering aperture and said pressure chamber and operating for varying a pressure in the forward-flow line as a function of operating states of the lifting mechanism; and
   a control unit for setting said metering aperture in relief pressure regulation to a volumetric flow of relief pressure fluid.

2. A lifting mechanism as defined in claim 1, further comprising an LS pressure balance preceding said multi-position valve.

3. A lifting mechanism as defined in claim 1, wherein said lifting mechanism is configured in a single-action fashion.

4. A lifting mechanism as defined in claim 1, further comprising a pressure sensor for detecting a pressure in the forward-flow line.

5. A lifting mechanism as defined in claim 1, further comprising an annular chamber operative in a "pressing" direction, of said lifting cylinder and supplyable with pressure fluid via said multi-position valve.

6. A lifting mechanism as defined in claim 5, further comprising a pressing-down pressure limiting valve located in a return line between said annular chamber and said multi-position valve.

7. A lifting mechanism as defined in claim 1, wherein said pressure limiting valve is configured so as to be set to pressures between substantially 5 and substantially 230 bar.

8. A lifting mechanism as defined in claim 1, wherein said pressure limiting valve has a descending characteristic curve.

9. A lifting mechanism as defined in claim 1; further comprising a control element of a control panel for manually setting a relief pressure.

10. A lifting mechanism as defined in claim 1; further comprising a control unit by which regulation of a lifting mechanism position and regulation of a relief or position are performed simultaneously via said relief pressure limiting valve.

11. A method for triggering a lifting mechanism, comprising the steps of:
adjusting a lifting cylinder by an electrohydraulic lifting mechanism regulator;
supplying a pressure chamber operative in a "carrying" direction with pressure fluid via a multi-position valve having a metering aperture;
limiting a pressure in a forward-flow line between the pressure chamber and the metering aperture via a proportionally variable relief pressure limiting valve;
setting the relief the pressure limiting valve to a relief pressure; and
reducing the metering aperture for reducing a volumetric flow of pressure fluid to a relief volumetric flow.

12. A method as defined in claim 11, further comprising lowering and relief of the lifting mechanism including the steps of blocking an LS pressure balance preceding the metering aperture, adjusting the multi-position valve to a "pressing" direction, automatically setting the pressure limiting valve to a maximum relief pressure, and upon reaching a set-point position switching over the multi-position valve to a "carrying" direction, and setting a preselected lower relief pressure at the relief pressure limiting valve.

13. A method as defined in claim 12, further comprising raising the relief pressure at the relief pressure limiting valve upon an upward motion of the lifting mechanism, and lowering upon a downward motion of the lifting mechanism.

14. A method as defined in 11, further comprising varying the relief volumetric flow via the metering aperture, as a function of a change in the lifting mechanism position or as a function of a lifting mechanism speed.

15. A method as defined in claim 11, further comprising for vibration damping, regulating a position of an attachment carried by the lifting mechanism relative to a set-point position regulation position, and simultaneously affecting a relief regulation via the relief pressure limiting valve relative to a set-point position located substantially below a transporting position of the position regulator.

16. A method as defined in claim 15, further comprising providing the set-point position regulator position as a transporting position, and actuating a corresponding control element for activating the vibration damping.

17. A method as defined by claim 15, further comprising for ascertaining the relief pressure in the vibration damping, first reducing the relief pressure at the relief pressure limiting valve until the lifting mechanism drops downward, and then increasing the relief pressure at the relief pressure limiting valve by a predetermined pressure difference.

18. A method as defined in claim 11, further comprising stopping a relief pressure regulation upon actuation of an external switch.

19. A method as defined in claim 11, further comprising setting the relief volumetric flow via the metering aperture to less than 50 L/min.

20. A method as defined in claim 19, further comprising setting the relief volumetric flow via the metering aperture to substantially 10 L/min.

21. A lifting mechanism for an agricultural utility vehicle or mobile work unit, comprising:
an electrohydraulic lifting mechanism regulator for adjustment and including a pressure chamber operating in a "carrying" direction, of a lifting cylinder supplyable with pressure fluid via a continuously variable multi-position valve having an adjustable metering aperture;
a proportionally variable relief pressure limiting valve in a forward-flow line between said metering aperture and said pressure chamber and operating for varying a pressure in the forward-flow line as a function of operating states of the lifting mechanism; and
a control unit for setting said metering aperture in relief pressure regulation to a volumetric flow of relief pressure fluid, wherein said pressure limiting valve has a descending characteristic curve.

22. A method for triggering a lifting mechanism, comprising the steps of:
adjusting a lifting cylinder by an electrohydraulic lifting mechanism regulator;
supplying a pressure chamber operative in a "carrying" direction with pressure fluid via a multi-position valve having a metering aperture;
limiting a pressure in a forward-flow line between the pressure chamber and the metering aperture via a proportionally variable relief pressure limiting valve;
setting the relief the pressure limiting valve to a relief pressure;
reducing the metering aperture for reducing a volumetric flow of pressure fluid to a relief volumetric flow; and
lowering and relief of the lifting mechanism including the steps of blocking an LS pressure balance preceding the metering aperture, adjusting the multi-position valve to a "pressing" direction, automatically setting the pressure limiting valve to a maximum relief pressure, and upon reaching a set-point position switching over the multi-position valve to a "carrying" direction, and setting a preselected lower relief pressure at the relief pressure limiting valve.

23. A method for triggering a lifting mechanism, comprising the steps of:
adjusting a lifting cylinder by an electrohydraulic lifting mechanism regulator;
supplying a pressure chamber operative in a "carrying" direction with pressure fluid via a multi-position valve having a metering aperture;
limiting a pressure in a forward-flow line between the pressure chamber and the metering aperture via a proportionally variable relief pressure limiting valve;
setting the relief the pressure limiting valve to a relief pressure;
reducing the metering aperture for reducing a volumetric flow of pressure fluid to a relief volumetric flow; and
varying the relief volumetric flow via the metering aperture, as a function of a change in the lifting mechanism position or as a function of a lifting mechanism speed.

24. A method for triggering a lifting mechanism, comprising the steps of:

adjusting a lifting cylinder by an electrohydraulic lifting mechanism regulator;

supplying a pressure chamber operative in a "carrying" direction with pressure fluid via a multi-position valve having a metering aperture;

limiting a pressure in a forward-flow line between the pressure chamber and the metering aperture via a proportionally variable relief pressure limiting valve;

setting the relief the pressure limiting valve to a relief pressure;

reducing the metering aperture for reducing a volumetric flow of pressure fluid to a relief volumetric flow; and for vibration damping, regulating a position of an attachment carried by the lifting mechanism relative to a set-point position regulation position, and simultaneously affecting a relief regulation via the relief pressure limiting valve relative to a set-point position located substantially below a transporting position of the position regulator.

\* \* \* \* \*